US008176476B2

(12) United States Patent
Li et al.

(10) Patent No.: US 8,176,476 B2
(45) Date of Patent: May 8, 2012

(54) ANALYZING SOFTWARE USAGE WITH INSTRUMENTATION DATA

(75) Inventors: Yantao Li, Beijing (CN); Adnan Azfar Mahmud, Kirkland, WA (US); Wenli Zhu, Beijing (CN); Haidong Zhang, Beijing (CN); Shuguang Ye, Beijing (CN); Bing Sun, Beijing (CN); Qiang Wang, Beijing (CN); Yingnong Dang, Beijing (CN); Guowei Liu, Beijing (CN); Min Wang, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1362 days.

(21) Appl. No.: 11/818,611

(22) Filed: Jun. 15, 2007

(65) Prior Publication Data

US 2008/0313149 A1 Dec. 18, 2008

(51) Int. Cl.
*G06F 9/44* (2006.01)
(52) U.S. Cl. ........ 717/130; 717/127; 717/131; 717/139; 717/140; 707/741; 707/742
(58) Field of Classification Search .................. None
See application file for complete search history.

(56) References Cited

U.S. PATENT DOCUMENTS

| | | | | | |
|---|---|---|---|---|---|
| 5,313,616 | A | * | 5/1994 | Cline et al. | 717/127 |
| 5,699,507 | A | * | 12/1997 | Goodnow et al. | 714/38.1 |
| 6,721,941 | B1 | * | 4/2004 | Morshed et al. | 717/127 |
| 6,742,179 | B2 | * | 5/2004 | Megiddo et al. | 717/130 |
| 6,760,903 | B1 | * | 7/2004 | Morshed et al. | 717/130 |
| 6,862,696 | B1 | * | 3/2005 | Voas et al. | 714/38.11 |
| 6,901,536 | B2 | * | 5/2005 | Davenport | 714/39 |
| 7,185,231 | B2 | | 2/2007 | Mullally et al. | |
| 7,484,205 | B2 | * | 1/2009 | Venkatapathy | 717/158 |
| 7,587,484 | B1 | * | 9/2009 | Smith et al. | 709/224 |
| 7,680,645 | B2 | * | 3/2010 | Li et al. | 703/22 |
| 7,681,085 | B2 | * | 3/2010 | Mahmud et al. | 714/45 |
| 7,739,282 | B1 | * | 6/2010 | Smith et al. | 707/736 |
| 7,765,216 | B2 | * | 7/2010 | Li et al. | 707/742 |
| 7,870,114 | B2 | * | 1/2011 | Zhang et al. | 707/705 |
| 7,917,894 | B2 | * | 3/2011 | Chen et al. | 717/124 |
| 2002/0038313 | A1 | * | 3/2002 | Klein et al. | 707/200 |
| 2004/0117760 | A1 | | 6/2004 | McFarling | |
| 2005/0015683 | A1 | | 1/2005 | Clark et al. | |

(Continued)

OTHER PUBLICATIONS

Title: Hardware and software instrumentation continually contribute to quality, author: Gollomp B, source: IEEE, dated: Oct. 9, 2006.*
Title: An Analysis of Performance Interference Effects in Virtual Environments, author: Younggyun Koh et al, source: IEEE, dated: Apr. 25, 2007.*

(Continued)

*Primary Examiner* — Chameli Das
(74) *Attorney, Agent, or Firm* — Gonzalez Saggio & Harlan LLP

(57) ABSTRACT

Described is a technology by which software instrumentation data collected from user program sessions are analyzed to output an analysis report or the like via example methods and an architecture configured for efficient operation. A client component queries a service for analysis related information. To process the query, the service works with a data manager, and via a high dimensional analysis component may use information processed from the software instrumentation data, such as in the form of one or more inverted indexes and/or raw value files. The service may include a usage analysis component, a feature recognition component that locates features from command sequences, a user recognition component and/or a program reliability component. One or more counterpart components at the client may generate analysis reports or the like based on the query results. The client also may maintain user libraries and feature libraries to facilitate analyses.

20 Claims, 5 Drawing Sheets

U.S. PATENT DOCUMENTS

| | | | |
|---|---|---|---|
| 2005/0229165 A1* | 10/2005 | Ma et al. | 717/130 |
| 2007/0016672 A1 | 1/2007 | Wilson et al. | |
| 2007/0033201 A1 | 2/2007 | Stienhans | |
| 2007/0038974 A1 | 2/2007 | Albahari et al. | |
| 2007/0038983 A1 | 2/2007 | Stienhans | |
| 2007/0112761 A1* | 5/2007 | Xu et al. | 707/5 |
| 2008/0033909 A1* | 2/2008 | Hornkvist et al. | 707/2 |
| 2008/0082968 A1* | 4/2008 | Chang et al. | 717/128 |
| 2010/0106706 A1* | 4/2010 | Rorex et al. | 707/709 |

OTHER PUBLICATIONS

Fischer, Gerhard, "User Modelling in Human-Computer Interaction", User Modeling and User-Adapted Interaction 11, 2001, pp. 65-86.

Farina, Andre G., et al.,"Representing Software Usage Models with Stochaistic Automata Networks", SEKE '02, Jul. 15-19, 2002, pp. 401-407.

Li, Xiaoming, et al., "Analyzing the Uses of a Software Modeling Tool", LDTA, 2006, pp. 1-18.

* cited by examiner

ANALYZING SOFTWARE USAGE WITH INSTRUMENTATION DATA

CROSS-REFERENCE TO RELATED APPLICATIONS

The present application is related to the following copending U.S. patent applications, assigned to the assignee of the present application, filed concurrently herewith and hereby incorporated by reference:

Analyzing Software Users with Instrumentation Data and User Group Modeling and Analysis, U.S. patent application Ser. No. 11/818,610;

Software Reliability Analysis Using Alerts, Asserts, and User Interface Controls, U.S. patent application Ser. No. 11/818,612;

Multidimensional Analysis Tool for High Dimensional Data, U.S. patent application Ser. No. 11/818,607;

Efficient Data Infrastructure for High Dimensional Data Analysis, U.S. patent application Ser. No. 11/818,879;

Software Feature Usage Analysis and Reporting, U.S. patent application Ser. No. 11/818,600; and Software Feature Modeling and Recognition, U.S. patent application Ser. No. 11/818,596.

BACKGROUND

Understanding the way in which software users use software can be very valuable when working to improve the effectiveness and ease of use of software applications. Traditional ways to analyze software users include usability studies, user interviews, user surveys and the like.

Various data can be collected during actual software usage to obtain information related to how users use and otherwise interact with a software program. However, analyzing that data to obtain useful information about the users, including how to model and analyze a specific group of users, is a difficult problem, and has heretofore been substantially limited.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which software instrumentation data collected from user sessions of one or more programs may be analyzed and output, such as in the form of a report. In one exemplified implementation, an architecture includes client component having a user interface, a service and a data manager. The architecture includes one or more analysis mechanisms to analyze program usage, feature usage, users, and/or reliability.

In an exemplified implementation, the client queries the service for analysis related information. The service may include a query receiving mechanism, a query queue, a result pool, and a scheduler that sends query data from the query pool to the data manager and receives query responses into the result pool for returning to the client component.

To process a query, the service works with the data manager, and may use information processed from the software instrumentation data, such as in the form of one or more inverted indexes and/or raw value files. To this end, the example service includes a high dimensional analysis component. To analyze program and/or command usage, the service includes a usage analysis component. To analyze feature usage, the service includes a feature recognition component that locates one or more specified features from command sequences collected during program usage. To analyze users, the service includes a user recognition component. To analyze program reliability, the service includes a reliability analysis component. One or more counterpart components at the client may generate analysis reports or the like based on the query results. Further, the client may maintain user libraries and feature libraries to facilitate analyses.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards analyzing software usage, such as for the purpose of improving software products such as application programs, and improving the user experience with those software products. To this end as described below, various aspects are directed towards collecting and analyzing various application-related usage data, referred to as software instrumentation data, in an attempt to understand the usage of an application program, including concepts such as how long, how much, how often and how extensive users use the application, the use of commands and/or features by users, and/or usage trends over time.

In other aspects, information corresponding to the software instrumentation data is analyzed by a data explorer tool, which in one example implementation includes client and service component parts. More particularly, a system design and architecture along with an underlying data system is described for the purposes of accessing data and performing various analyses. Examples analyses including analyzing user software interaction with respect to commands and features, and analyzing users with software instrumentation data and software user group modeling and analysis. The tool also facilitates analyzing the relationships between any combinations of software instrumentation data variables, and analyzing software reliability.

For purposes of understanding, the technology is described herein by use of examples, including those that operate in various environments. Further, the programs exemplified herein are generally a suite of application programs such as those provided as part of the Microsoft® Office software product suite. However, as will be understood, these are only non-limiting examples, and the technology is applicable to different user environments and different software products, including individual application programs and operating system components.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
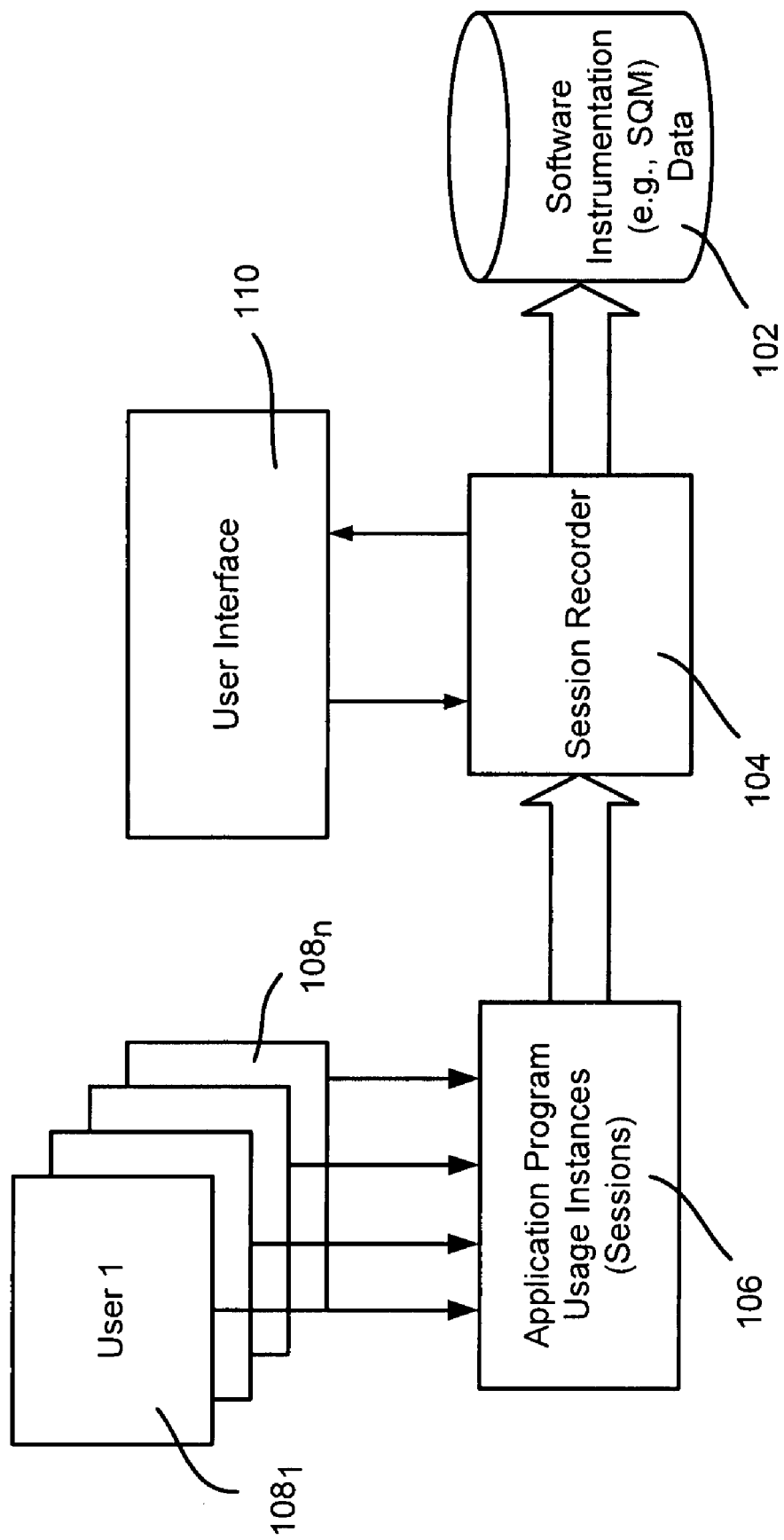
FIG. 1 shows an example representation of recording software instrumentation data for subsequent analysis.

Turning to FIG. 1, there is shown a mechanism for collecting software instrumentation data 102, including a session recorder 104 that collects various data from one or more application instances 106 corresponding to various users $108_1$-$108_n$, where n represents any practical number of users. The session recorder 104 may be per application instance/user, or may be a mechanism such as an agent on each computing device of a network that communicates with at least one data collection server component running on a network server or the like. A user interface 110 allows an test operator or the like to set collection parameters, such as from which program or programs to collect the instrumentation data, from which users to collect data, how long a collection session should last (if the program is not ended by the user within that time limit) and so forth.

In general, the instrumentation data 102 comprise data collected from each user session, where a session corresponds to actual usage by a user of an executing program. A typical session starts from the application start (e.g., by double clicking on the application executable or a document that launches the application executable, or by choosing the application from a start menu), and ends when the application is closed (e.g., by choosing "Exit" in the application or closing the application window). Sessions can also be time limited, e.g., if a session exceeds twenty-four hours, the session is ended and the instrumentation data to that point recorded (the application continues to run). Sessions can also end by non-normal termination of a program, e.g., because of program or system crashes.

Figure 2:
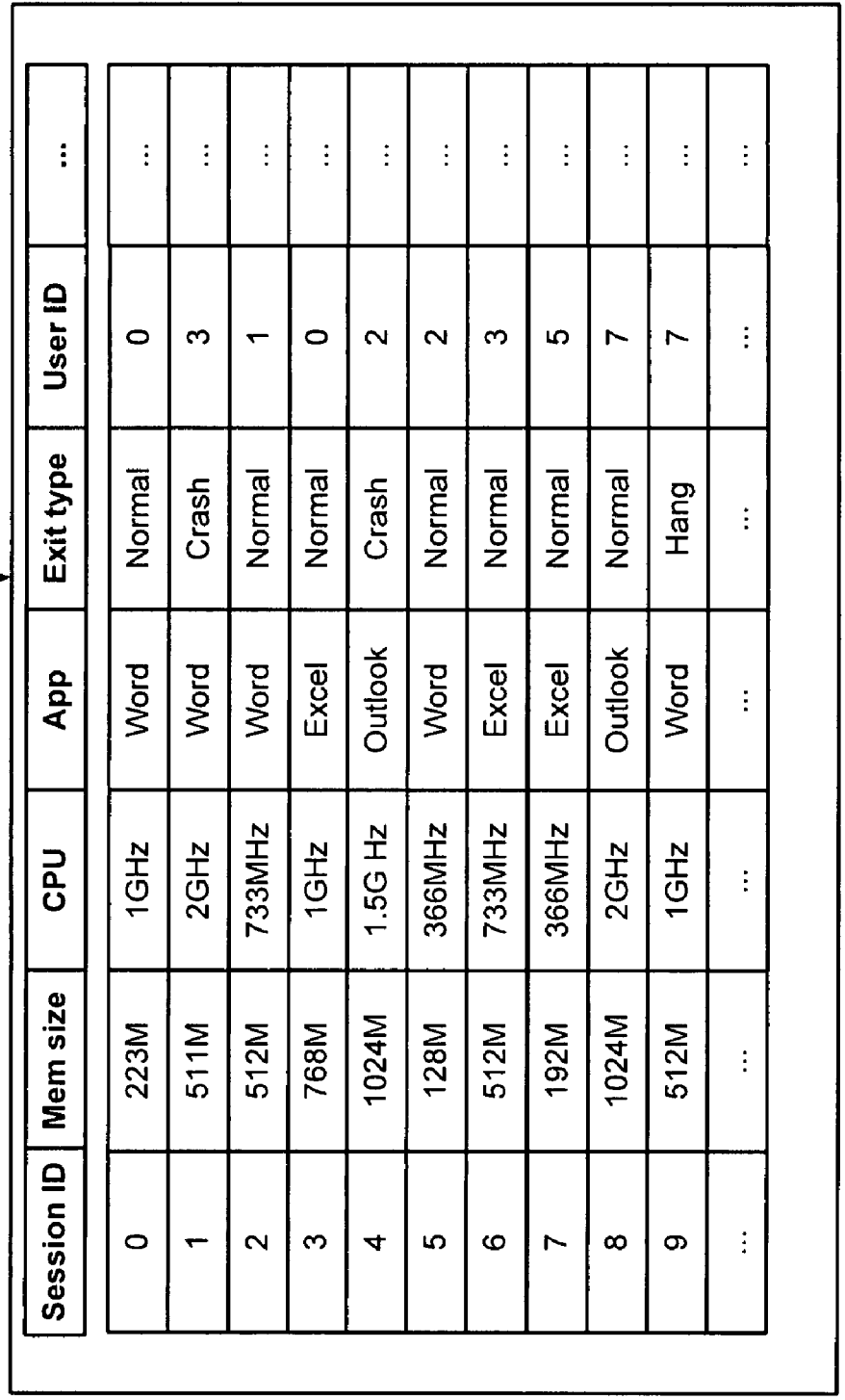
FIG. 2 shows a representation in a table format of example software instrumentation (e.g., software quality metrics) data saved for various program usage sessions by users of a suite of application programs.

FIG. 2 provides an example of one type of software instrumentation data 102, with some of the data (arranged in columns) collected for some number of sessions (arranged in rows); it is equivalent to have the sessions be in the columns and the rows represent the data. In one example implementation, each session is associated with some or all of the information shown in FIG. 2, including a session ID, a user ID, and an application name. Other information that is typically recorded includes the application version, a start time, an end time, the commands used during the session and still other data, such as the number of files opened and so forth. Note that in actual implementations, the instrumentation data 102 may be many thousands of dimensions.

In the example of FIG. 2, it is seen that the software programs for which the instrumentation data 102 is being collected comprises application programs from the Microsoft® Office suite of software products. For these and other such programs, the software instrumentation data 102 sometimes may be alternatively referred to as software or service quality metrics (or SQM) data.

Figure 3:
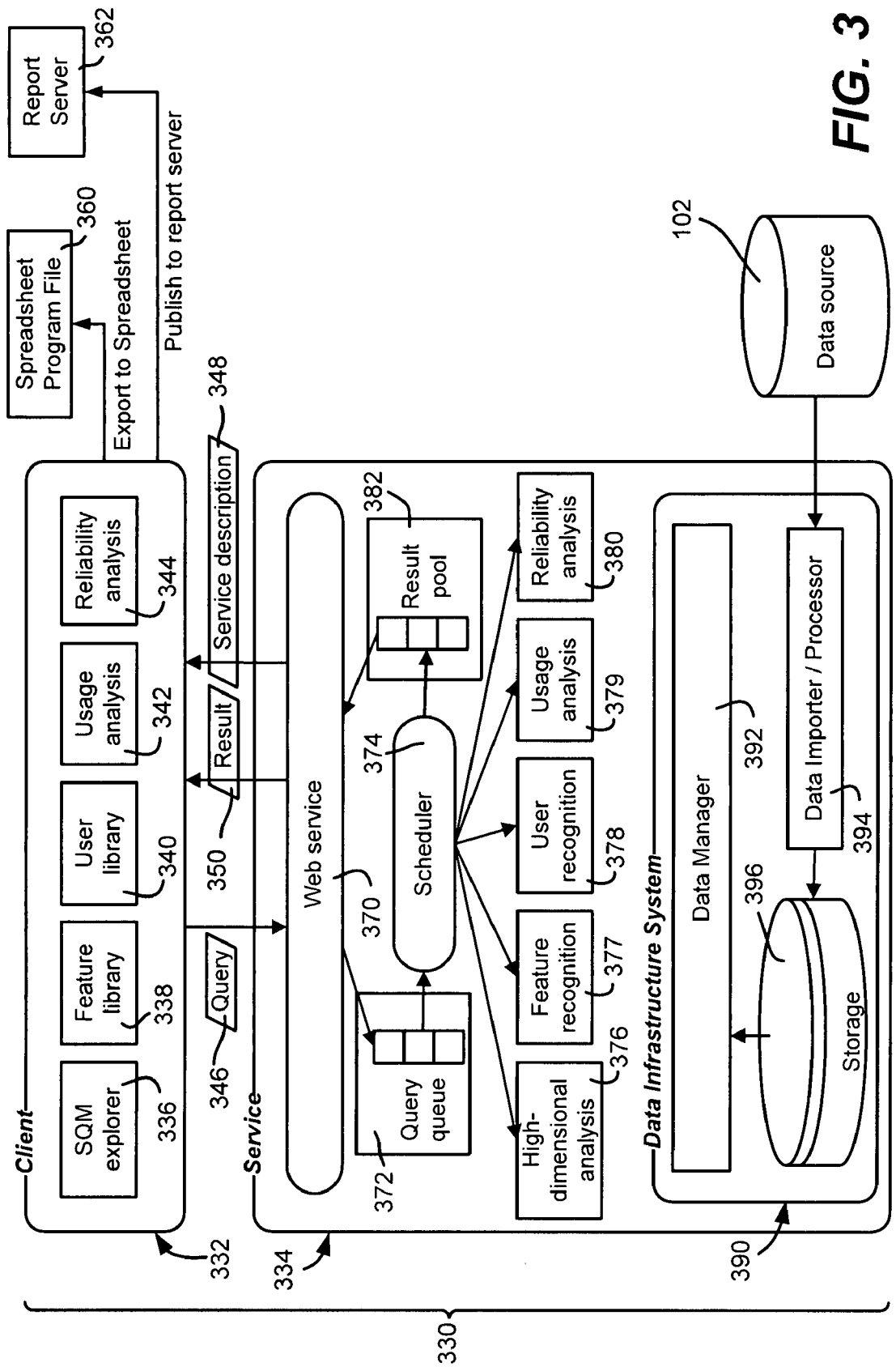
FIG. 3 shows an example representation of an architecture/system for accessing software instrumentation data to provide software usage analyses.

To analyze software product usage, the software instrumentation data 102 is processed, such as to measure the overall usage of an application by a group of users. FIG. 3 shows an example system architecture in which a data explorer system 330 includes a client part 332 and service part 334.

In one implementation, the data explorer client 332 includes an application program (e.g., SQM explorer) 336 by which data explorer users (people who need to analyze software instrumentation data) may define an analysis. In the example of FIG. 3, there are five components or types of analyses shown, including the SQM explorer component 336, a feature library component 338, a user library component 340, a usage analysis component 342 and a reliability analysis component 344. With each component, a user may define an analysis goal, e.g., in the form of a query 346.

A service description 348 describes available elements for the query definition, which is downloaded from the data explorer service 334. When the query 346 is defined, it is sent to the data explorer service 334 for analysis, and returned as a result set 350. After the result set 350 is returned, the data explorer client 332 presents corresponding analysis results to the user, such as a report. Users can export the results, such as to one or more spreadsheet files/programs 360, and/or publish the report data to a server reporting service 362.

At the service component 334, in the example of FIG. 3, a web service 370 receives a query such as the query 346. When received, the web service 334 queues the query into a query queue 372, and from there a scheduler 374 dispatches each query to an appropriate analysis module 376-380 based on the type of query, to perform an analysis. When a performed analysis completes, the scheduler 374 puts the results for that query into a result pool 382, from where the web service 370 returns a result set (e.g., the result set 350) back to the client 332. Note that FIG. 3 represents only one example implementation, e.g., the query handler may be any service, not necessarily a web service, and/or the example query queue/scheduler/result pool may be any mechanism that manages queries and results.

In the example of FIG. 3 there are five analysis modules 376-380 shown on the service side 334. These modules 376-380 access data through a data infrastructure system 390, which manages the data for the analysis and provides access to the data via a data manager 392, e.g., via APIs. In one implementation described in the aforementioned U.S. patent application entitled "An Efficient Data Infrastructure for High Dimensional Data Analysis," the data is organized in a different format from the original SQM data (represented by the data source 102), e.g., including inverted index files and raw (or compressed) data files for a dimension. To this end, the data importer/processor 394 imports data from the SQM data source 102 and reformats it for storing into the data infrastructure system data storage 396.

Turning to the components/analysis types of the data explorer, there are usually many SQM data points instrumented in a software product. For example, in Microsoft® Office, there are typically thousands of data points, or variables, which keep track of usage data. One example of a data point is MemorySize, which tracks the amount of RAM on the machine on which the session ran. Note that a commonly used method to analyze the data points is to use OLAP cubes with pre-defined dimensions and measures, e.g., a machine configuration cube may be used in which MemorySize is a dimension, with sessions and occurrences as measures. Such a cube allows a user to analyze typical machine configurations such as size of RAM, processor speed. However, a problem with the cube approach is it is difficult to analyze data across cubes. For example, to understand the relationship of MemorySize and time it takes to start up a program, another cube needs to be created. As a result, it is more difficult to analyze any combinations of data points. The SQM Explorer 336 allows users to explore SQM data points and their relationships, and to use common but more difficult to compute measures such as user count, crash ratio, mean time to crash, and so forth in an analysis. The SQM Explorer is further described in the aforementioned U.S. patent application entitled "Multidimensional Analysis Tool for High Dimensional Data."

With reference to the feature library 338, a common type of instrumentation data is command clicks. In general, every time a user uses a command (e.g., by clicking on a menu or toolbar button, using a command via the keyboard, and so forth) corresponding command data is recorded. Typical analysis of command clicks includes total occurrence, session count and user count. However, users may use more than one command to complete a task, for example, copy and paste. Analyzing sequences of commands helps to better understand the interaction between the user and the software. More particularly, as described in the aforementioned U.S. patent application entitled "Software Feature Modeling and Recognition," the feature library 338 allows software designers to define a "feature" comprising a sequence of commands to accomplish a task. The SQM data is then analyzed to see how many times such a feature occurs, the paths of such a feature, and so forth. The feature library 338 is a library of such features.

Understanding the users of software is also important for the design of software. For example, software designers often want to focus their analysis to a specific group of users who have certain characteristics, e.g., they may want to understand how users who have used a word processing program for a long time may differ from users who have used that program for only a short amount of time in terms of their usage. A user library 340 allows data explorer users to define and maintain specific groups of users using SQM data points and features. User groups are further described in the aforementioned U.S. patent application entitled "Analyzing Software Users with Instrumentation Data and User Group Modeling and Analysis."

Usage Analysis 342 and 379 includes both feature analysis and user analysis. When data explorer users define features and user groups, they may want to perform further analysis, such as analyzing the characteristics of feature users, cross feature usage, session analysis, how users use an application such as how long, how much, how often and how extensive, the use of commands by users, usage trend over time, and the types of users, and so forth. For example, the data explorer allows users to perform such analyses via pre-defined report templates. Usage analyses are further described in the aforementioned U.S. patent application entitled "Analyzing Software Users with Instrumentation Data and User Group Modeling and Analysis." Feature analyses are further described in the aforementioned U.S. patent application entitled "Software Feature Usage Analysis and Reporting."

Reliability analysis 344 and 380 is directed towards understanding the reliability of software such as how often it crashes or hangs, which is important for improving the quality of the software. SQM data provides information about whether an application closed normally, crashed or hung, as well as the contextual information of a crash or hang, such as the states of the software as recorded in other SQM data points. The reliability analysis 344 and 380 allow software designers to use SQM data to analyze such reliability metrics such as crash ratio, failure ratio, mean time to crash, mean time to failure, alerts, asserts, and so forth. Reliability analysis is further described in the aforementioned U.S. patent application entitled "Software Reliability Analysis Using Alerts, Asserts, and User Interface Controls."

Figure 4:
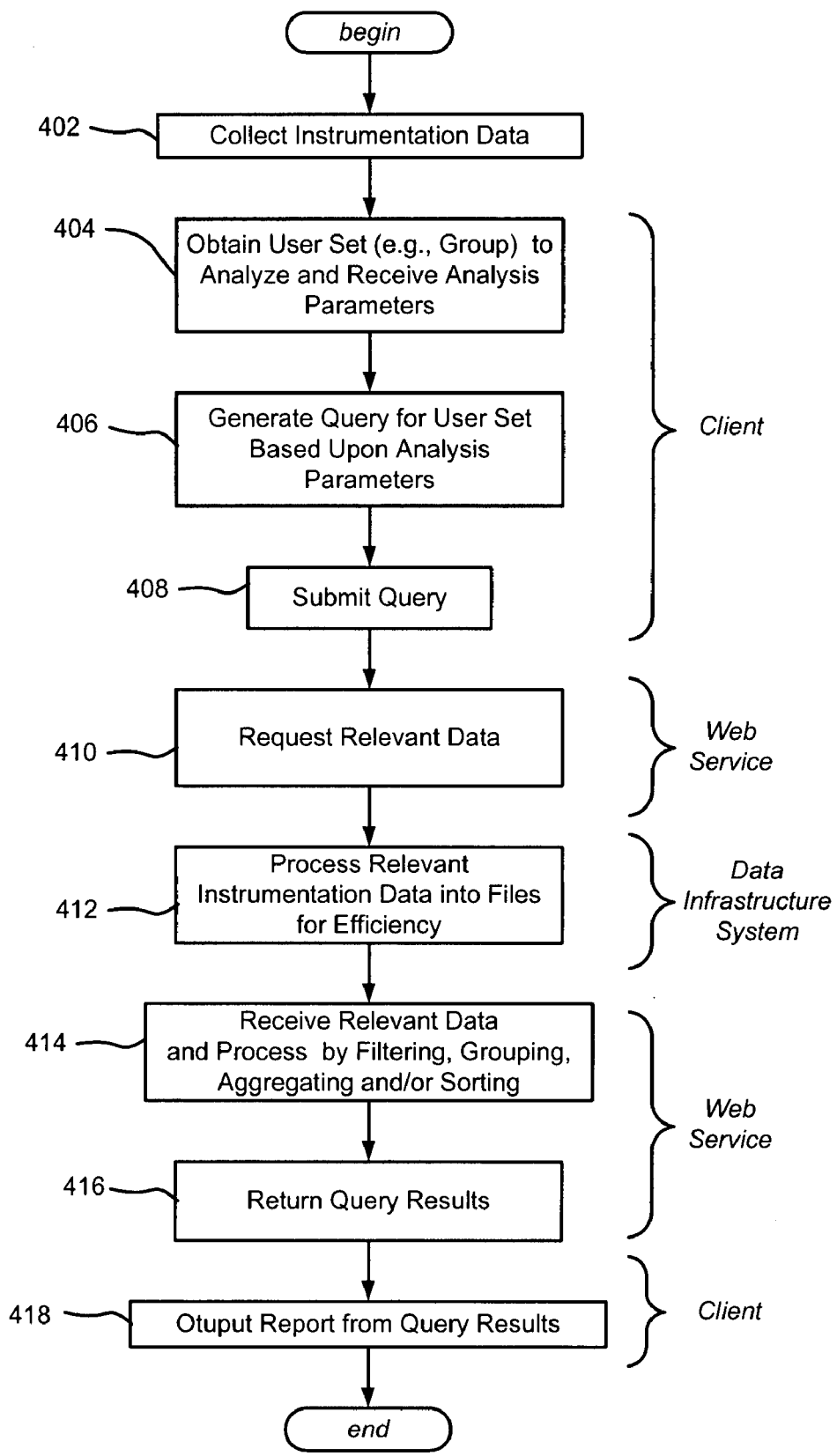
FIG. 4 is a flow diagram representing various example concepts related to collecting, accessing and processing software instrumentation data for usage analysis.

FIG. 4 summarizes an overall example analysis process, beginning at step 402 which represents collecting the software instrumentation data. As is readily understood, the software instrumentation data may be collected at any previous time, not necessarily just prior to analysis.

Step 404 represents obtaining (at the client component 332) the analysis criteria (e.g., application usage, feature usage, command usage, trend analysis and/or others), and obtaining the user set, which may be all, external, internal, a user group and so forth as set above. Step 406 generates the query from the operator-input analysis and/or user filtering criteria, and step 408 represents submitting the query.

Step 410 represents the web service requesting the relevant data from the data manager 392 based on the query. As described in the aforementioned U.S. patent application entitled "Efficient Data Infrastructure for High Dimensional Data Analysis," for efficiency in analysis, the data may be converted into files comprising an inverted index and a raw (possibly compressed) data file. Step 412 represents building these files as needed.

When the web service 370 receives the requested data, the web service may filter, group, aggregate and/or sort the data as desired to provide a suitable output. Example operations to filter, group, aggregate and/or sort are described in the aforementioned U.S. patent application entitled "Multidimensional Analysis Tool for High Dimensional Data."

Step 416 representing returning the query results, which may be in the form of a report, which is output in some way as represented at step 418. Note that the web service and/or the user interface may take part in generating the report, or reformatting the returned information, e.g., as a file suitable for importation into a spreadsheet program.

Exemplary Operating Environment

Figure 5:
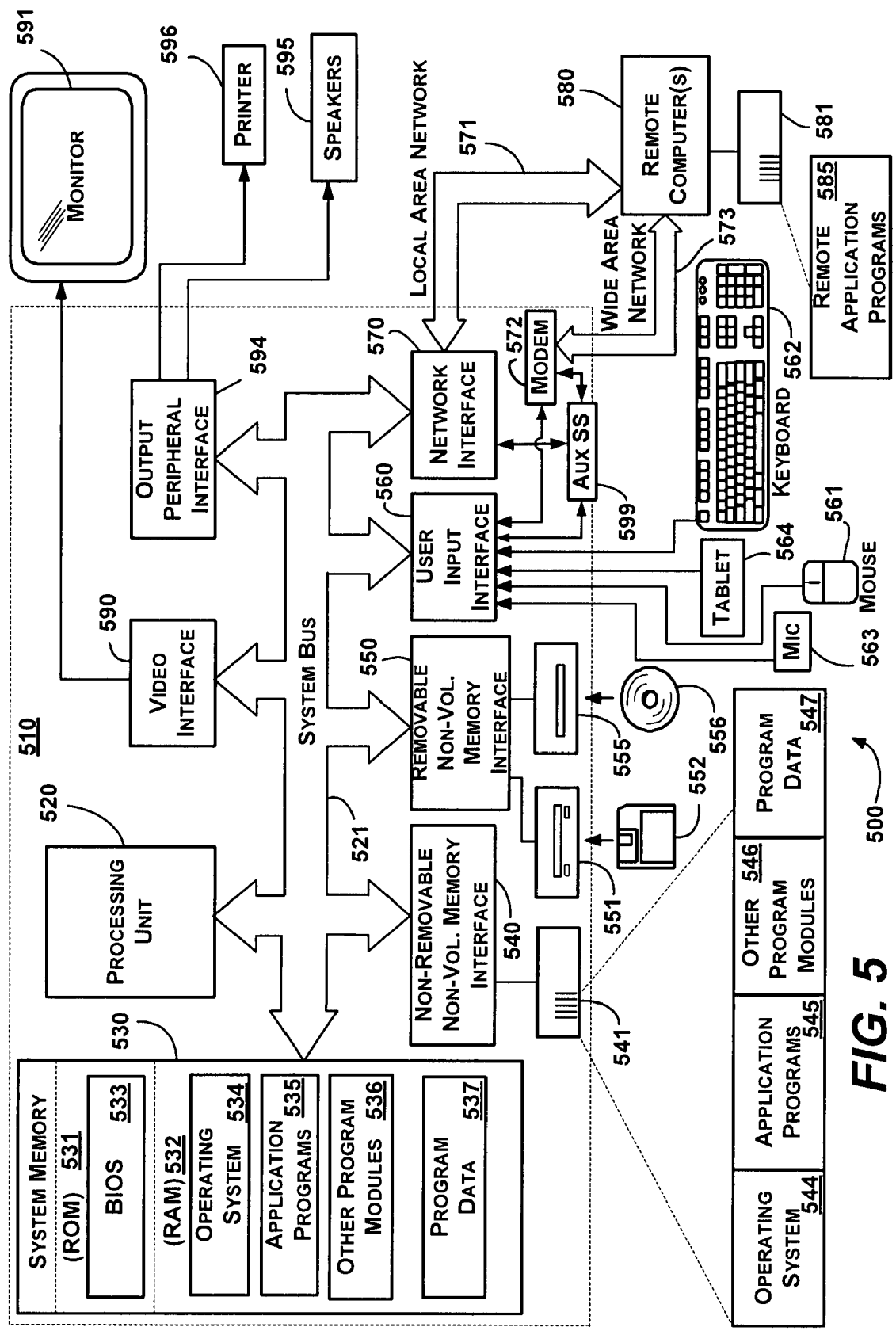
FIG. 5 is an illustrative example of a general-purpose computing environment into which various aspects of the present invention may be incorporated.

FIG. 5 illustrates an example of a suitable computing system environment 500 on which the general architecture (FIG. 3) may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising:
    at least one processor;
    a memory, communicatively coupled to the at least one processor and including computer executable components, comprising:
        a service configured to analyze collected software instrumentation data and generate a result set using the collected software instrumentation data, the service including at least one analysis mechanism of a set of analysis mechanism, the set including at least one of: a program usage analysis mechanism, a command usage analysis mechanism, a feature usage analysis mechanism, a user analysis mechanism, or a reliability analysis mechanism;
        a data manager;
        a data infrastructure component configured to interact with the service to access the collected software instrumentation data, the data infrastructure component including a data importer component configured to process at least some data corresponding to the collected software instrumentation data into an inverted index and a raw value file; and
        an interface, wherein the interface is incorporated as part of an explorer component for querying the service for information corresponding to software quality metrics data related to the collected software instrumentation data from user sessions of one or more programs.

2. The system of claim 1 wherein the service includes a query receiving mechanism, a query queue, a result pool, and a scheduler that sends query data from the query pool to the data manager and receives query responses into the result pool for returning to the interface.

3. The system of claim 1 wherein the interface outputs information for human or machine review, or both human and machine review, the information corresponding to at least one query response to a report server or in a format for outputting via a spreadsheet program, or both to a report server and in a format for outputting via a spreadsheet program.

4. The system of claim 1 wherein the service includes a high dimensional analysis component which works in conjunction with the data manager to process the inverted index and the raw value file into query results based on a query received from the interface.

5. The system of claim 1 wherein the collected software instrumentation data includes command sequences collected from actual program usage, and wherein the service includes a feature recognition component that locates one or more specified features from information corresponding to at least some of the command sequences to provide feature-related results in response to a client component query.

6. The system of claim 5 wherein the interface includes a usage analysis component for processing the feature-related results to output a feature usage report.

7. The system of claim 1 wherein the collected software instrumentation data includes data related to users collected from actual program usage, and wherein the service includes a user recognition component that locates one or more groups of users from information corresponding to at least some of the users to provide user-related results in response to a client component query.

8. The system of claim 1 wherein the collected software instrumentation data includes data related to program usage or program commands, or both program usage and program commands, and wherein the service includes a usage recognition component that recognizes program usage or command usage, or both program usage and command usage, from information corresponding to at least some of the program usage or program commands data to provide program usage-related results in response to a client component query.

9. The system of claim 8 wherein the interface includes a usage analysis component for processing the program usage-related results to output a program usage report or a command usage report, or both a program usage report and a command usage report.

10. The system of claim 1 wherein the collected software instrumentation data includes data related to program reliability collected from actual program usage, and wherein the service includes a reliability component that analyzes program usage, command usage, or users, or any combination of program usage, command usage and users to provide reliability results in response to a client component query.

11. The system of claim 10 wherein the interface includes a reliability analysis component for processing the reliability results to output a reliability report.

12. The system of claim 1 wherein the interface includes a feature library for maintaining feature-related information, or a user library for maintaining user related information, or both a feature library for maintaining feature-related information and a user library for maintaining user related information.

13. The system of claim 1 further comprising means for collecting software instrumentation data.

14. At least one computer-readable storage medium storing computer-executable instructions, which in response to execution by a computer, cause the computer to perform steps comprising:
    receiving a query directed towards analyzing information corresponding to at least some software instrumentation data collected from program usage sessions;
    performing an analysis based at least in part on the software instrumentation data collected to obtain information corresponding to the query in the form of at least one inverted index and at least one raw value file;

processing the information obtained, by performing at least one of a filtering, grouping, aggregating or sorting operation; and returning a result in response to the query.

15. The computer readable storage medium of claim 14 having further computer-executable instructions, which in response to execution by the computer, cause the computer to perform further steps comprising, queuing the query when received, dequeing the query for processing, and returning the result via a result pool.

16. A system comprising:

a client component having a user interface;

a service, implemented at least in part on at least one processing unit, coupled to the client component via a query and query response mechanism, the client component configured to query the service for results related to software program data based on software instrumentation data collected from user sessions of one or more programs, the client and the service configured to provide at least one of a program usage analysis, a command usage analysis, a feature usage analysis, a user analysis, or a reliability analysis, and wherein the service is further configured to generate a result set using the software instrumentation data collected and at least one of the program usage analysis, the command usage analysis, the feature usage analysis, the user analysis, or the reliability analysis;

a data manager; and a data infrastructure component including a data importer component configured to process at least some data corresponding to the collected software instrumentation data into an inverted index and a raw value file.

17. The system of claim 16 wherein the collected software instrumentation data includes data related to program reliability collected from actual program usage, and wherein the service includes a reliability component that analyzes program usage, command usage, or users, or any combination of program usage, command usage and users to provide reliability results in response to a client component query.

18. The system of claim 16 wherein the client component includes a feature library for maintaining feature-related information, or a user library for maintaining user related information, or both a feature library for maintaining feature-related information and a user library for maintaining user related information.

19. The system of claim 16 wherein the service further includes a query receiving mechanism, a query queue, a result pool, and a scheduler that sends query data from the query pool to a data manager and receives query responses into the result pool for returning to the client component.

20. The system of claim 16 wherein the collected software instrumentation data includes data related to program usage or program commands, or both program usage and program commands, and wherein the service includes a usage recognition component that recognizes program usage or command usage, or both program usage and command usage, from information corresponding to at least some of the program usage or program commands data to provide program usage-related results in response to a client component query.

* * * * *